United States Patent [19]

Wilson

[11] 4,197,830

[45] Apr. 15, 1980

[54] SOLAR HEATERS

[76] Inventor: William J. Wilson, 136 Cockburn St., Masterton, New Zealand

[21] Appl. No.: 845,976

[22] Filed: Oct. 27, 1977

[51] Int. Cl.[2] .............................................. F24J 3/02
[52] U.S. Cl. ................................................... 126/430
[58] Field of Search .......................................... 126/270

[56] References Cited

U.S. PATENT DOCUMENTS

| 3,957,109 | 5/1976 | Worthington | 126/270 |
| 3,995,615 | 12/1976 | Hojnowski | 126/270 |
| 4,038,969 | 8/1977 | Smith | 126/270 |
| 4,076,016 | 2/1978 | Phillips | 126/270 |
| 4,117,828 | 10/1978 | Brownfield | 126/270 |
| 4,122,828 | 10/1978 | DiPeri | 126/270 |

FOREIGN PATENT DOCUMENTS 2609638 9/1977 Fed. Rep. of Germany .......... 126/270

*Primary Examiner*—Peter M. Caun

[57] ABSTRACT

A solar heat absorber including a heat exchanger panel having a first surface and a second surface, the first surface having a grid-like pattern of upstanding intersecting walls with at least one of the walls being of a height which is greater than the other walls. The wall of greater height reaches substantially to the cover of the heat absorber so as to restrain air currents near the cover. The second surface includes a number of parallel spaced-apart walls defining passageways along which air can flow.

20 Claims, 3 Drawing Figures

SOLAR HEATERS

This invention relates to solar heaters.

The use of solar heat in a heat exchanging device to heat water for domestic or industrial purposes is well known. This type of heating is an attractive proposition in areas where supplies of electricity are not readily available or where electricity tariffs are high. Whilst such solar heaters serve a useful purpose in heating water and thus save on electrical heating requirements or use of other natural resouces, power or fuel is still used in large quantities for heating the air in buildings or dwellings. Thus there is a need for a device which can be used for heating the air and operates on the readily available solar energy.

Whilst the need for such a device is evident the device must not have such a high capital cost to produce and install that for a considerable period of time the costs exceed those of conventional heating devices. For this reason it is important to be able to provide a heating device that is of simple construction, uses a minimum quantity of material and requires little skilled labour for its assembly.

In addition the efficiency of the solar heat exchanger of the heating device should be as high as possible, taking into account the cost factor, and to this end it is desirable that loss of heat be kept to an absolute minimum. With known solar heat exchangers it has been found that heat loss occurs because of convection air currents passing over the hot exchanger panel surface and circulating down the inside surface of the cold covering glass. Accordingly movement of air around the exchanger should be restricted so there is little heat loss due to convection.

Broadly the invention in one aspect consists of a heat exchanger for solar heater comprising a panel having upstanding walls extending from each surface thereof, the walls on one surface, which in use is the solar heat absorbing surface, being such as to restrict air movement and the walls on the other surface being such as to define passages along which air movement can take place.

In the following more detailed description of the invention reference will be made to the accompanying drawings in which.

Figure 1:
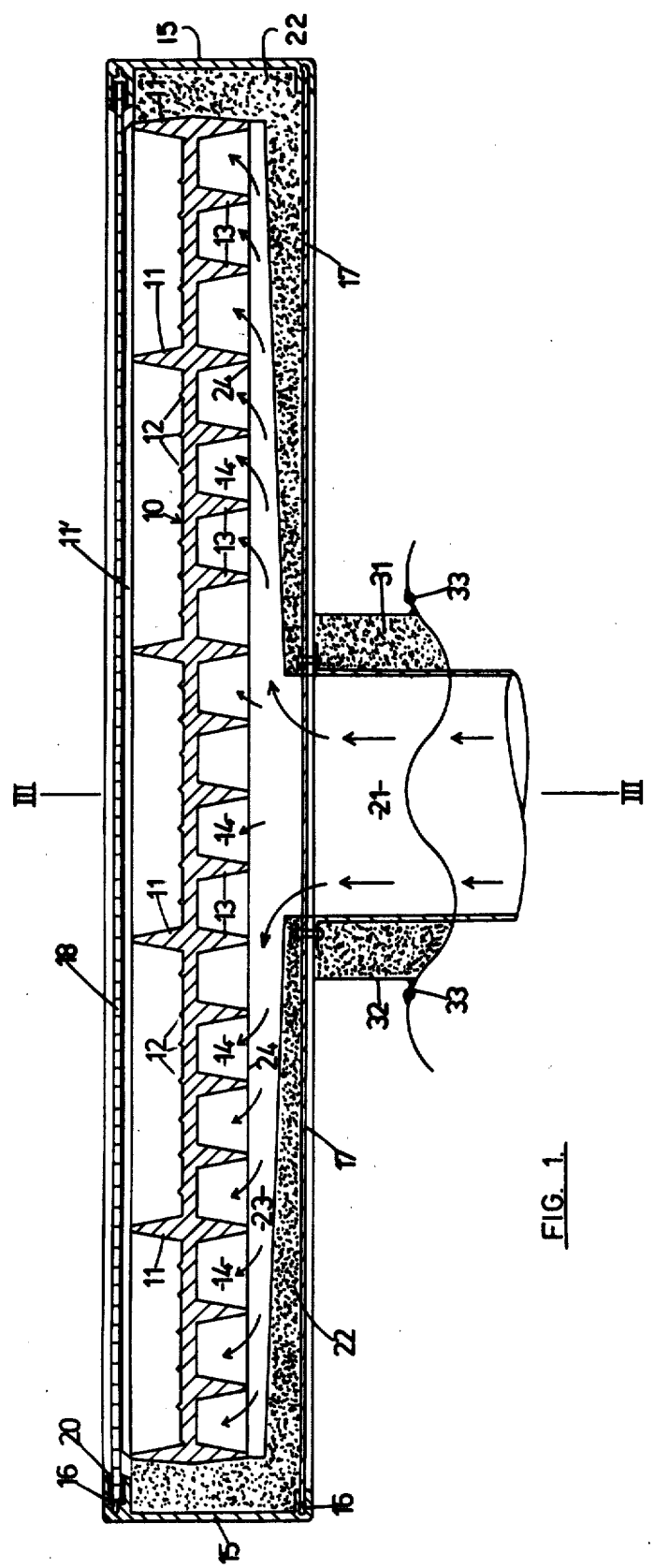
FIG. 1 is a transverse sectional view through the solar heat absorber.
Figure 3:
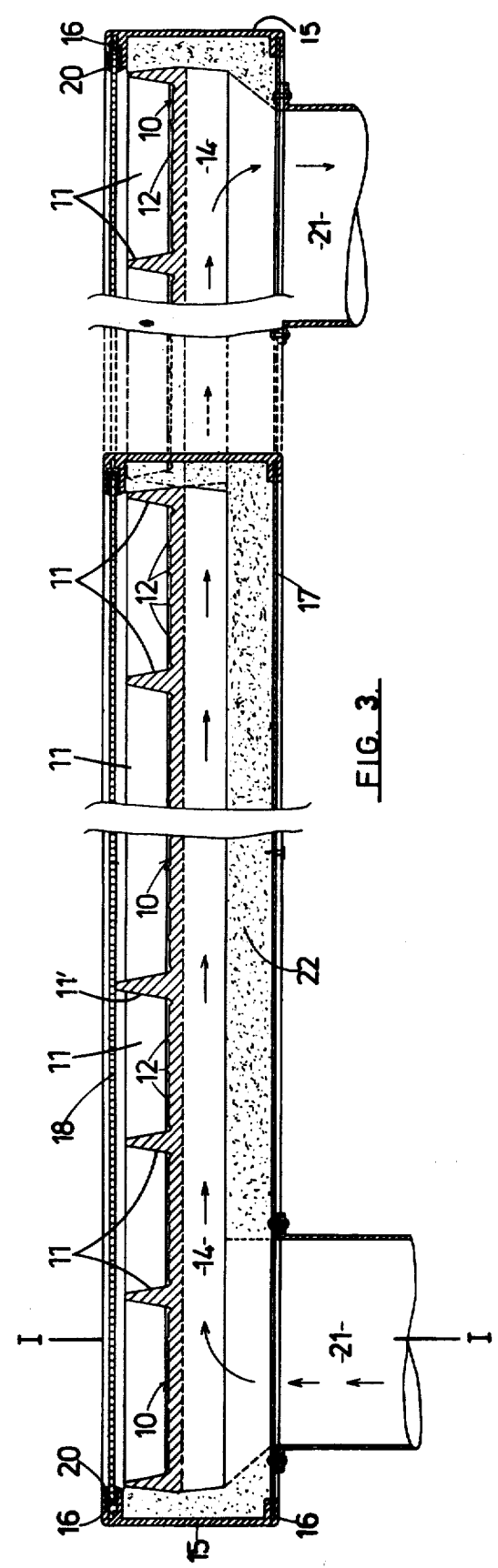
FIG. 3 is a longitudinal sectional view through the solar heat absorber, the section being taken on line III—III of FIG. 1.

The panel 10 is preferably of cast aluminium or aluminium alloy construction and on one surface has a series of upstanding intersecting walls 11. The walls 11, which are preferably of truncated triangular cross-section shape, extend longitudinally and transversely of the panel 10 and are conveniently spaced so that a grid of substantially rectangular areas bounded by intersecting walls 11 or walls 11 and 11' are formed. Within each rectangular area the surface of the panel 10 is formed with a grid like pattern either of small upstanding walls 12 as shown in FIGS. 1 and 3 or V shaped grooves (not shown). In addition to the grooves or walls 12 the surfaces of the panel 10 and walls 11 are of coarse texture to provide maximum paint adhesion for say a matt dark colour paint, under thermal conditions. The upper surface of panel 10 is thus similar in appearance to the panel described and claimed in my New Zealand Patent specification No. 181,854.

The walls 13 are of such a depth as to reduce radiation heat loss and are so spaced as to reduce convection heat loss. For example, in a preferred form of the invention the depth from the top of the wall 13 to the surface of the panel is 25 mm and the area bounded by the walls is in the range of 76-92 mm wide and 98-122 mm long. The wall surfaces are at an angle of 10° to the vertical. The lower walls 13 are spaced at intervals in the range of 28-32 mm and are of the same height and angle as walls 11. It will be appreciated that these dimensions are only by way of example and the invention is not limited thereto.

The other surface of panel 10 is provided with a number of parallel longitudinal walls 13 which define a series of passageways 14. These walls are also preferably of truncated triangular cross-section.

The panel 10 is located within a housing which is conveniently constructed from extruded aluminium or aluminium alloy walls 15 which have inwardly directed grooves 16 top and bottom. An aluminium cover 17 locates between the lower grooves 16 and a glass cover 18 between the upper grooves 16. A plastics material seal 20 locates the glass cover 18 in grooves 16. The walls 15 are screwed together by stainless steel self tapping screws.

The panel 10 is supported in the housing by polystyrene foam 22 or other suitable insulation as shown in FIG. 1. At each end of the housing an air duct 21 is attached to the cover 17 and opens into a chamber 23 provided between the polystyrene foam 22 and panel 10. A thin sheet 24 of aluminium foil is placed between the polystyrene foam 22 and the top edges of walls 13. As best indicated in FIG. 2 air can enter through the lower duct 21 and pass along passages 14 to reach upper chamber 23 and finally pass through the other duct 21.

At spaced intervals along the panel 10 one of the transverse walls 11' is of a greater height than the remaining walls. This wall 11' extends for a distance such that it almost touches the underside of glass cover 18. The extended walls 11' thus reduce any heat loss by convection air currents passing over the panel surface. For the example previously given the higher walls 11' are about 5 mm above walls 11.

Figure 2:
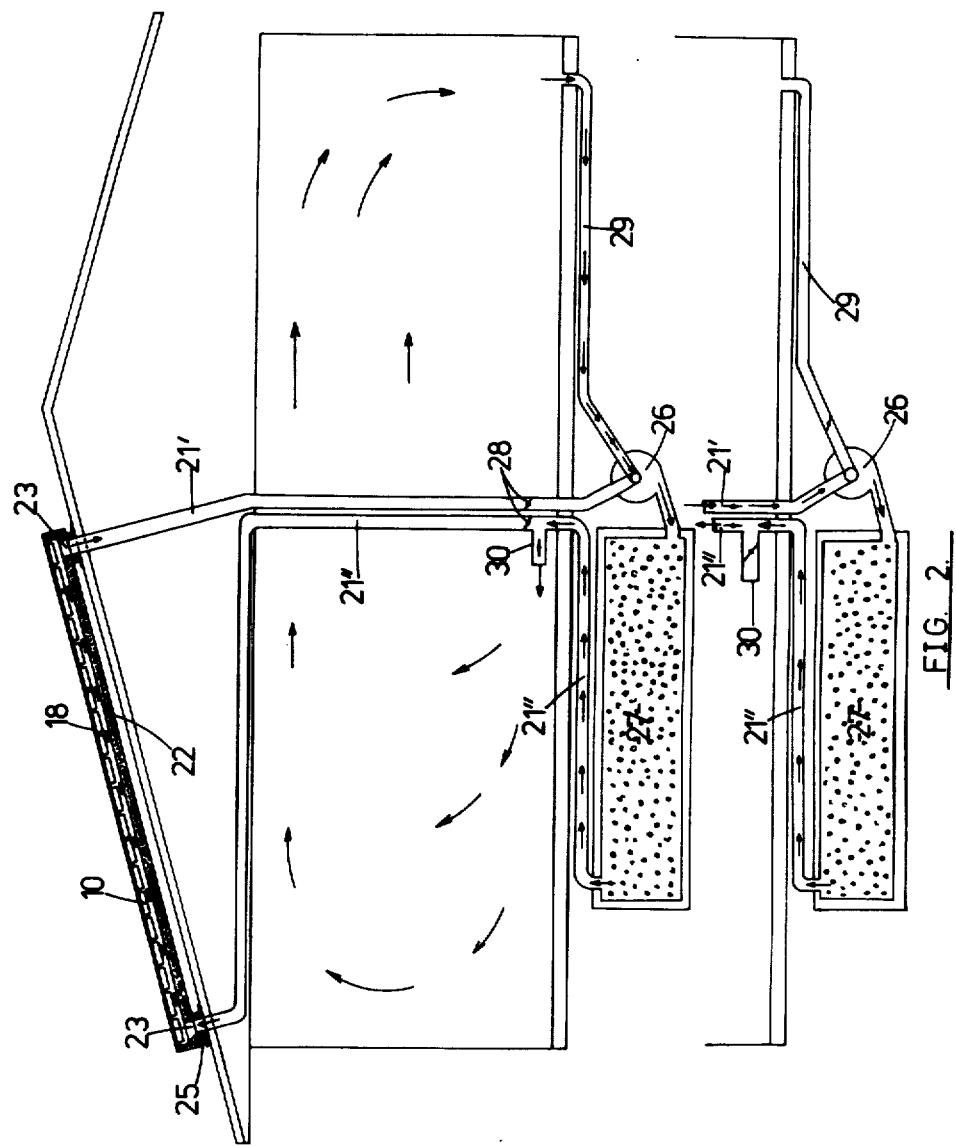
FIG. 2 is a schematic representation of the solar heat absorber of FIG. 1 in use in heating a building.

In FIG. 2 there is shown a typical application of the heat exchanger. The housing is mounted on the roof of a building by suitable insulated mounts 25 about each duct 21. The mounts 25 are conveniently a cylinder 31 of polystyrene with an external weather flashing 32. The flashing is rivetted as at 33 to the roof cladding C heading from the upper duct 21 is ducting 21° which is coupled to a blower fan 26. The fan 26 is connected to heat storage chamber 27. Ducting 21" leads from the chamber 27 to the lower duct 21 of the heat exchanger. The upper portion of FIG. 2 shows heat circulation at night where ductings 21' and 21" and closed by valves 28 and air drawn through ducting 29 by fan 26 enters the chamber 27 and is heated before entering the building through branch duct 30. During sunny periods valves 28 are open and valves 28' in ductings 29 and 30 are closed. Air heated by passing through passageways 14 is drawn by fan 26 via ducting 21' into the heat storage chamber. A thermostat micro switch mounted in the vicinity of X shown in FIG. 1 controls the valves in the ducts and the fan dependent on the heat entering the housing.

The heat storage chamber can be made from concrete, wood, steel or galvanised panel or fibre glass. Irrespective of material the chamber is insulated, moisture proof and sealed. It can be sited horizontally or vertically either inside or outside the building or buried. The chamber is preferably filled with pebbles of for example 40 to 50 mm size to permit free air penetration and give area density of maximum proportion to storage heat though other heat absorbant material can be employed.

The heat exchanger can be mounted on the wall of a building to take advantage of the low angle of the sun during winter. Housings of say two exchangers can also be coupled together to provide a larger heat absorption area. The housings can be coupled end to end or alternatively side by side with suitable slots cut in adjacent walls of the housings. In FIG. 3 there is illustrated two panels in an end to end relationship with the housing extended. The glass 18 is butt joined by a plastic insertion strip as can the base panel 17. Still further two housings can be mounted at a corner of a building with a housing on edge wall to take advantage of the travel of the sun. These and other combinations of heat exchangers and mounting position will be evident to those skilled in the art as will any modifications or constructional alterations necessary but still within the scope of the invention.

The exchanger according to this invention has been devised to reduce cost by increased efficiency. Construction of the panel is quick and economical as it can be formed in a die in a single operation. The aluminium material from which the panel is formed has good anti-corrosive properties as well as readily lending itself to good die casting.

The walls provided on the upper surface of the panel serve two purposes. Firstly they restrict the formation of convection currents over the surface of the panel and secondly provide greater radiation impact over a wider varying angle of the sun's rays. Walls 11' which are higher than walls 11 avoid thermal breakage of the glass cover due to uneven temperature buildup. A small amount of air movement is thus allowed directly below the glass cover but thermal movements of the main air mass over the bulk space against the glass is restricted by the high barrier walls 11' whilst the lower barriers 11 restrict panel face air movements.

The upstanding walls also serve to present a greater area of conductive metal to the sun's rays and this being of unit cast construction gives direct intensity of heat to the finning or walls 13 on the underside of the panel. Walls 13 increase the metal area beneath the panel and so increase the area offered to the flow of air being heated. The 10° slope of the walls 11 and 11' provides, as stated previously, a greater presentation of metal to the sun's rays over a greater travel of the sun, however, this means that the panel need not be critically sited if the dwelling on which the panel is situated does not have a roof that is facing correctly.

Coupled with these advantages the grooved or ribbed surface of the panel between the upper walls 11 and 11' provides maximum heat absorption and gives a surface which has good paint adhesion. Structurally the panel is strong to avoid buckling with heat. Since upstanding walls 13' are close to the glass cover even thermal movement of the panel is important to avoid contact with the glass and consequential breakage thereof. Mounting the panel in its frame to allow for expansion and contraction is achieved by the four soft rubber or plastic grommets. These grommets also serve the purpose of eradicating the possibility of electrolysis taking place between the frame and panel.

What I claim is:

1. A solar heat absorber comprising:
   a housing having a translucent cover;
   a heat exchanger panel located within said housing;
   inlet and outlet duct means coupled to said housing, whereby air can respectively enter and leave said housing, said heat exchanger panel having a first surface which faces said cover and a second surface on the opposite side thereof, said first surface having a grid-like pattern of upstanding intersecting walls with at least one of said walls being of a height which is greater than the other walls, said wall of greater height reaching substantially to the said translucent cover so as to restrain air currents near the said cover, and said second surface having a number of parallel spaced-apart walls extending therefrom, said heat exchanger panel being separated from the walls of said housing by insulating material, the walls extending from the second surface defining passageways along which air entering into said housing from said inlet duct means can flow to said outlet duct means and in the process be heated by heat absorbed by the first surface from solar radiation and transferred through said panel.

2. A solar heat absorber as claimed in claim 1, wherein the walls on the first and second surfaces are formed integrally with the panel, said walls being of truncated triangular shaped cross-section.

3. A solar heat absorber as claimed in claim 2, wherein the panel and walls are of cast aluminum or aluminum alloy construction.

4. A solar heat absorber as claimed in claim 1, wherein each portion of the first surface bounded by said walls has a pattern of intersecting unstanding ribs.

5. A solar heat absorber as claimed in claim 4, wherein said ribs are of triangular cross-sectional shape.

6. A solar heat absorber as claimed in claim 1, wherein each portion of the first surface bounded by said walls has a pattern of intersecting V shaped grooves.

7. A solar heat absorber as claimed in claim 1, wherein said first and second surfaces and the walls thereof have a coarse finish and are coated with a matte dark color paint.

8. A solar heat absorber as claimed in claim 1, wherein said air flow passages extend transversely to the said higher wall or walls.

9. A solar heat absorber as claimed in claim 8, wherein the number of walls on the first surface which extend parallel to the air flow passages is less than the number of walls defining the said air flow passages.

10. A solar heat absorber as claimed in claim 1, wherein the walls of the housing have inwardly directed grooves at top and bottom, said translucent cover being located between said top grooves and a base cover being located between said bottom grooves.

11. A solar heat absorber as claimed in claim 10, wherein the walls are of extruded aluminum construction.

12. A solar heat absorber as claimed in claim 10, wherein the translucent cover is a glass sheet.

13. A solar heat absorber as claimed in claim 10, wherein the translucent cover and the base cover are located in said wall grooves by plastic material seals.

14. A solar heat absorber as claimed in claim 1, wherein the said insulation is polystyrene.

15. A solar heat absorber as claimed in claim 1, wherein said higher wall or walls extending from said first surface are of such a height as to terminate just short of the inner surface of said translucent cover.

16. A solar heat absorber as claimed in claim 1, wherein a sheet of aluminum foil is place between the insulation material and the extremities of the walls on the said second surface.

17. A solar heat absorber as claimed in claim 1, wherein each of said inlet and outlet duct means opens into a chamber which extends across the extremities of the walls of the said second surface.

18. A solar heating system comprising a solar heat absorber as claimed in claim 1, wherein an outlet ducting extends from said outlet duct means to fan means, said fan means being coupled to a heat storage chamber and inlet ducting leading from said heat storage chamber to the inlet duct means of said absorber, said inlet and outlet duct means being situated at opposite ends of the said heat exchanger panel.

19. A solar heating system as claimed in claim 18, wherein a valve is provided in the ducting downstream of the fan means and a valve is provided in the ducting upstream of the said storage chamber.

20. A solar heating system as claimed in claim 18, wherein the storage chamber is filled with stones or heat absorbing material.

* * * * *